(12) United States Patent
Miao et al.

(10) Patent No.: US 11,275,041 B2
(45) Date of Patent: Mar. 15, 2022

(54) METHOD AND DEVICE FOR TESTING THERMAL CONDUCTIVITY OF NANOSCALE MATERIAL

(71) Applicant: WUHAN JOULE YACHT SCIENCE & TECHNOLOGY CO., LTD., Hubei (CN)

(72) Inventors: Xiangshui Miao, Hubei (CN); Hao Tong, Hubei (CN); Yang Zhou, Hubei (CN); Yuanbing Wang, Hubei (CN); Yingrui Cai, Hubei (CN)

(73) Assignee: WUHAN JOULE YACHT SCIENCE & TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/963,834

(22) PCT Filed: Jan. 29, 2018

(86) PCT No.: PCT/CN2018/074419
§ 371 (c)(1),
(2) Date: Jul. 22, 2020

(87) PCT Pub. No.: WO2019/144396
PCT Pub. Date: Aug. 1, 2019

(65) Prior Publication Data
US 2021/0055238 A1 Feb. 25, 2021

(30) Foreign Application Priority Data
Jan. 24, 2018 (CN) .......................... 201810067584.2

(51) Int. Cl.
*G01N 25/18* (2006.01)
*G01K 1/00* (2006.01)
(Continued)

(52) U.S. Cl.
CPC ............. *G01N 25/18* (2013.01); *G01N 25/20* (2013.01); *G01N 27/18* (2013.01)

(58) Field of Classification Search
USPC .................................. 374/44, 141, 208, 183
See application file for complete search history.

(56) References Cited

U.S. PATENT DOCUMENTS

| 2014/0010258 A1* | 1/2014 | Hyun | ..................... G01N 25/18 374/44 |
| 2021/0109047 A1* | 4/2021 | Miao | ..................... G01N 25/02 |

FOREIGN PATENT DOCUMENTS

| CN | 101975794 | 2/2011 |
| CN | 102053101 | 5/2011 |

(Continued)

OTHER PUBLICATIONS

"International Search Report (Form PCT/ISA/210) of PCT/CN2018/074419", dated Oct. 23, 2018, with English translation thereof, pp. 1-6.

(Continued)

*Primary Examiner* — Mirellys Jagan
(74) *Attorney, Agent, or Firm* — JCIP Global Inc.

(57) ABSTRACT

A method and device for testing the thermal conductivity of a nanoscale material 1. The method comprises the following steps: preparing or placing a nanoscale material 1 to be tested on a substrate and plating an electrode 2 at both ends thereof; determining a resistance temperature coefficient R' of the nanoscale material 1 to be tested and a resistance $R_0$ at the ambient temperature $T_0$; generating a small signal voltage $V_{3\omega}$ with a frequency being $3\omega$ on the nanoscale material 1 to be tested; and measuring the small signal voltage $V_{3\omega}$, and in conjunction with each piece of test data, calculating, according to a formula, the thermal conductivity κ of the nanoscale material to be tested 1 at the ambient temperature $T_0$.

10 Claims, 3 Drawing Sheets

(51) Int. Cl.
  *G01K 7/00*   (2006.01)
  *G01N 25/20*  (2006.01)
  *G01N 27/18*   (2006.01)

(56) References Cited

FOREIGN PATENT DOCUMENTS

| | | |
|---|---|---|
| CN | 102944573 | 2/2013 |
| CN | 104034752 | 9/2014 |
| CN | 104880482 | 9/2015 |
| CN | 107037079 | 8/2017 |
| CN | 107085007 | 8/2017 |
| WO | 2016134217 | 8/2016 |

OTHER PUBLICATIONS

L. Lu, W. Yi, and D. L. Zhang, "A 3ω method for specific heat and thermal conductivity measurements," Review of Scientific Instruments, Feb. 2002, pp. 1-16.

Hsiao-Fang Lee, et al., "In-plane thermal conductance measurement of one-dimensional nanostructures," Journal of Thermal Analysis and Calorimetry, vol. 68, Jun. 2009, pp. 495-500.

Li Qingwei, "Studies on Thermal Conductance of Carbon Nanotubes", Department of Biophysics, Tsinghua University, Apr. 2010, pp. 1-128.

\* cited by examiner

METHOD AND DEVICE FOR TESTING THERMAL CONDUCTIVITY OF NANOSCALE MATERIAL

CROSS-REFERENCE TO RELATED APPLICATION

This application is a 371 of international application of PCT application serial no. PCT/CN2018/074419, filed on Jan. 29, 2018, which claims the priority benefit of China application no. 201810067584.2, filed on Jan. 24, 2018. The entirety of each of the above mentioned patent applications is hereby incorporated by reference herein and made a part of this specification.

BACKGROUND

Technical Field

The present disclosure relates to the technical field of test for thermal properties of materials, in particular to a testing method and device for the thermal conductivity of a nanoscale material.

Description of Related Art

Thermal conductivity is one of important parameters for representing thermophysical properties of a material. With the continuous miniaturization and high speed of a device, a microelectronic device and a developing nanoelectronic device generate a lot of heat in a very small space, and heat accumulation caused by relatively low thermal conductivity of the material of the device has become an important link of hindering its development, on the other hand, a phase-change memory operated by virtue of heat requires a nano phase-change material unit to have relatively low thermal conductivity so as to improve the performance of the device. Meanwhile, when the size of the material is reduced to the nanoscale, a specific surface effect, volume effect and quantum effect may appear, and accordingly, the material may also significantly change on the aspects of thermal property and other properties to achieve excellent properties that other general materials do not have, so that the material may be widely applied to various fields of electronics, medicines, chemical industry, military, aerospaces, etc. Therefore, it is significant to accurately define the thermal conductivity of the material at nanoscale.

Most of existing testing methods for the thermal conductivity of a material are suitable for bulk materials or film materials, while a thermal conductivity value of the material is significantly changed due to special or abnormal characteristics of the material at nanoscale, and it is difficult to realize the compatibility of the material at nanoscale and most of the existing testing methods, for example, the material is small in particle size and obvious in phonon boundary scattering, and thus, the thermal conductivity value of the material is directly affected; and the material is very large in a specific surface area, a larger error may be caused by thermal diffusion on the surface, and thus, a test result will be significantly affected by environmental change during test, etc. A thermal conductivity testing method proposed for the material at nanoscale at present is mainly divided into a steady state method and a non-steady state method. The steady state method is realized by establishing steady temperature gradient distribution on a suspended nanoscale material by virtue of current, laser, etc., and then, determining a temperature distribution condition on the material under a temperature steady condition by using a Raman spectroscopy, a fluorescent spectrometry, etc., so as to determine the thermal conductivity of the material under the nanoscale. Both Chinese patents for inventions "a method for simultaneously measuring the laser absorptivity and thermal conductivity of a single micro-nano wire material (the publication number of CN102944573A and the publication date of Feb. 27, 2013) and a method for measuring the thermal conductivity of a single semiconductor nanowire material (the publication number of CN102053101A and the publication date of May 11, 2011) belong to the steady state method for measuring the thermal conductivity, and these methods are complex in acquiring temperature distribution of the material and particularly the material at nanoscale, are easily disturbed by test environment factors and relatively high in test instrument threshold. A $3\omega$ method is common in the non-steady state method, and related theoretical derivations and calculation formulae are given and verified in Review of scientific instruments, 2001, 72(7): 2996-3003 by Lu, L. et al. A structure required by the testing method is relatively simple and mainly includes a four-electrode structure for test in a high-vacuum environment and a nanoscale material arranged on the four-electrode structure and suspended relative to a substrate. The testing method requires that the nanoscale material should have a suspended structure, and therefore, most of nanoscale materials which have been used for test at present are separately prepared and are then transferred by a probe to the four-electrode structure prepared in advance so as to be tested.

For the above testing methods for the thermal conductivity of the nanoscale material, the problems of a large specific surface area and obvious thermal diffusion on the surface of the material are solved on the aspect of test conditions, a suspended nanomaterial structure is prepared and placed in a vacuum test environment, and therefore, the testing methods require various test conditions, and are complex in structure and relatively high in instrument threshold. In addition, the above test materials are all of suspended structures, so that most of the nanoscale materials for test are separately prepared by using an electrochemical deposition method, for example, in this way, the aim that the nanoscale materials prepared by using the process grow on a large scale in a specific area to form nanoscale structures with specific sizes may not be achieved; and then, the nanoscale materials synthesized by using different preparation methods have great difference in microstructures such as crystal grains and crystal lattices, and the difference in the microstructures directly affects the macroscopically measured thermal conductivity, and therefore, the reference value of the tested thermal conductivity is finite for the thermal conductivity values of nanoscale materials prepared by using other processes such as a typical lift-off process in the semiconductor industry. In the lift-off process which has been widely applied in the semiconductor industry at present, a way of growth from bottom to top is adopted, which decides that the prepared nanoscale material is inevitably in contact with a material on a lower layer, while thermal transfer brought by the contact between the two materials violates an assumed condition of the existing $3\omega$ method, so that the $3\omega$ method is invalid. Lee, Hsiao-Fang et. al amend an original formula in Journal of thermal analysis and calorimetry, 2010, 99 (2): 495-500, introduce a testing method for the thermal conductivity under a condition that the nanoscale material is in contact with the material on the lower layer, but the high-vacuum environment is still required, and the substrate is simply regarded as a single medium during theoretical derivation, and thus, test conditions are complex, defects exist in a theoretical derivation model, and errors exist in a final test result. Therefore, there is an urgent need for a thermal conductivity testing method which requires simple and convenient test conditions and ensures accurate test result under the condition that the nanoscale material is in contact with the substrate.

SUMMARY

The present disclosure aims at providing a testing method and device for a thermal conductivity of a nanoscale material to solve the problems in an existing testing method for the thermal conductivity of the nanoscale material that test conditions are complex, defects exist in a theoretical derivation model and errors exist in a final test result.

The present disclosure is realized as follows.

On one hand, the present disclosure provides a testing method for a thermal conductivity of a nanoscale material, including the following steps:

preparing or placing a to-be-tested nanoscale material on a substrate, and plating electrodes at two ends of the to-be-tested nanoscale material, wherein the substrate includes a substrate medium layer and an insulating medium layer located on the substrate medium layer, and the insulating medium layer has a thickness $d_1$ and a thermal conductivity $\kappa_1$, and the substrate medium layer has a thermal conductivity $\kappa_2$ and a thermal capacity $c_2$; and a part, located between the two electrodes, of the to-be-tested nanoscale material is used as a part for a thermal conductivity test, and the part for the thermal conductivity test has a length L, a line width w and a thickness d;

placing the to-be-tested nanoscale material and the substrate in a gas atmosphere with a variable ambient temperature T, and measuring resistance values of the to-be-tested nanoscale material at different ambient temperatures by changing the ambient temperature of the gas atmosphere so as to determine a resistance temperature coefficient R' of the to-be-tested nanoscale material and a resistance value $R_0$ at an ambient temperature $T_0$;

keeping a filling gas in the gas atmosphere have a thermal conductivity $\kappa_3$ and a thermal capacity $c_3$ at the ambient temperature $T_0$ of the gas atmosphere, and applying an excitation current $I_0 \sin\omega t$ with a frequency $\omega=2\pi f$ to the two ends of the to-be-tested nanoscale material to generate a small signal voltage $V_{3\omega}$ with a frequency $3\omega$ on the to-be-tested nanoscale material; and measuring the small signal voltage $V_{3\omega}$, and performing calculation according to the following formula in combination with the above test data to obtain the thermal conductivity $\kappa$ of the to-be-tested nanoscale material at the ambient temperature $T_0$:

$$\kappa = \left[ \frac{2I_0^3 R_0 R' L}{V_{3\omega}} - \frac{\pi^2 L A_1}{\left( \frac{d_1}{\kappa 1} + \frac{\sqrt{\kappa_2/c_2 \pi f}}{\kappa_2} \right)} - \frac{\pi^2 L A_2}{\frac{\sqrt{\kappa_3/c_3 \pi f}}{\kappa_3}} \right] / \pi^4 S,$$

wherein $A_1$ is a contact area of the to-be-tested nanoscale material and the substrate, $A_2$ is an area of the to-be-tested nanoscale material exposed in an ambient gas, and S is a sectional area of the to-be-tested nanoscale material.

Further, the part, for the thermal conductivity test, of the to-be-tested nanoscale material is of a one-dimensional linear structure.

Further, if the part, for the thermal conductivity test, of the to-be-tested nanoscale material is in direct contact with the substrate medium layer, namely the thickness of the insulating medium layer is zero, a term $$\frac{\pi^2 L A_1}{\left( \frac{d_1}{\kappa 1} + \frac{\sqrt{\kappa_2/c_2 \pi f}}{\kappa_2} \right)}$$

in the formula of the thermal conductivity $\kappa$ is simplified to be $$\frac{\pi^2 L A_1}{\frac{\sqrt{\kappa_2/c_2 \pi f}}{\kappa_2}}.$$

Further, if the filling gas in the gas atmosphere is vacuum when the ambient temperature of the gas atmosphere is $T_0$, a value of a term $$\frac{\pi^2 L A_2}{\frac{\sqrt{\kappa_3/c_3 \pi f}}{\kappa_3}}$$

in the formula of the thermal conductivity $\kappa$ is zero.

Further, both the line width w and the thickness d of the part, for the thermal conductivity test, of the to-be-tested nanoscale material range from 1 nm to 1000 nm.

Further, the line width w and the line length L of the part, for the thermal conductivity test, of the to-be-tested nanoscale material meet a relationship: $L \geq 10 \cdot w$.

Further, the to-be-tested nanoscale material is a semiconductor material.

Further, the thickness of the insulating medium layer is smaller than a penetration depth $\lambda_1$ of a thermal wave in the insulating medium layer, wherein $\lambda_1 = \sqrt{\kappa_1/c_1 \pi f}$, and the thickness of the substrate medium layer is greater than a penetration depth $\lambda_2$ of a thermal wave in the substrate medium layer, wherein $\lambda_2 = \sqrt{\kappa_2/c_2 \pi f}$.

On the other hand, the present disclosure further provides a testing device for a thermal conductivity of a nanoscale material, including a heating furnace, a signal generator, a power amplifier, an adjustable resistance box, single-gain differential amplifiers and a lock-in amplifier, wherein a substrate is arranged inside the heating furnace, and configured to place a to-be-tested nanoscale material with two ends plated with electrodes, and the heating furnace is internally provided with a temperature thermocouple; the signal generator is electrically connected with the power amplifier, the power amplifier is configured to be electrically connected with the electrode at one end of the to-be-tested nanoscale material, the adjustable resistance box is configured to be electrically connected with the electrode at the other end of the to-be-tested nanoscale material, the signal generator is configured to generate a sine alternating signal with a known frequency and amplitude value and transmit the sine alternating signal to the power amplifier, and the power amplifier is configured to convert an electric signal input by the signal generator into a current signal and amplify the current signal so as to drive the heating of the to-be-tested nanoscale material and drive the adjustable resistance box, and the adjustable resistance box is configured to provide a voltage signal only containing a fundamental wave voltage under current excitation; the two single-gain differential amplifiers are provided, one of the single-gain differential amplifiers is configured to be electrically connected with the electrodes at two ends of the to-be-tested nanoscale material, and the other single-gain differential amplifier is electrically connected with the adjustable resistance box, and the two single-gain differential amplifiers are respectively configured to extract a voltage signal at two ends of the to-be-tested nanoscale material from the electrodes, extract a voltage signal from the adjustable resistance box and input the above two voltage signals to the lock-in amplifier; and the lock-in amplifier is configured to separate a fundamental wave voltage and a triple-frequency voltage from the voltage signals on the to-be-tested nanoscale material and the voltage signal on the adjustable resistance box.

Further, the substrate includes a substrate medium layer and an insulating medium layer located on the substrate medium layer.

Compared with the prior art, the present disclosure has the following beneficial effects:

by using the testing method and device for the thermal conductivity of the nanoscale material, provided by the present disclosure, the thermal conductivity of each material at nanoscale may be accurately measured, the method is improved with the specific disadvantages that an existing 3ω method requires a to-be-tested section of the nanoscale material to be suspended and requires a high-vacuum test environment and the reference value of the tested thermal conductivity is finite due to the incompatibility of a preparation process of the nanoscale material and a semiconductor process, amending is made based on a test principle, analysis for thermal conduction processes from the to-be-tested nanoscale material to a multilayer film substrate in contact with the to-be-tested nanoscale material and from the to-be-tested nanoscale material to a surrounding air environment is additionally provided, and errors caused in a test process are eliminated, so that the to-be-tested nanoscale material in the method may directly grow or be placed on the multilayer film substrate, and restrictive conditions of the suspension of the to-be-tested section and the high-vacuum test environment are eliminated. Therefore, the test structure and the test environment of the to-be-tested nanoscale material are simpler, the preparation way is more diversified, and particularly, the testing method is compatible with an existing semiconductor process, so that the thermal conductivity of the prepared to-be-tested nanoscale material has higher reference significance.

Figure 1:
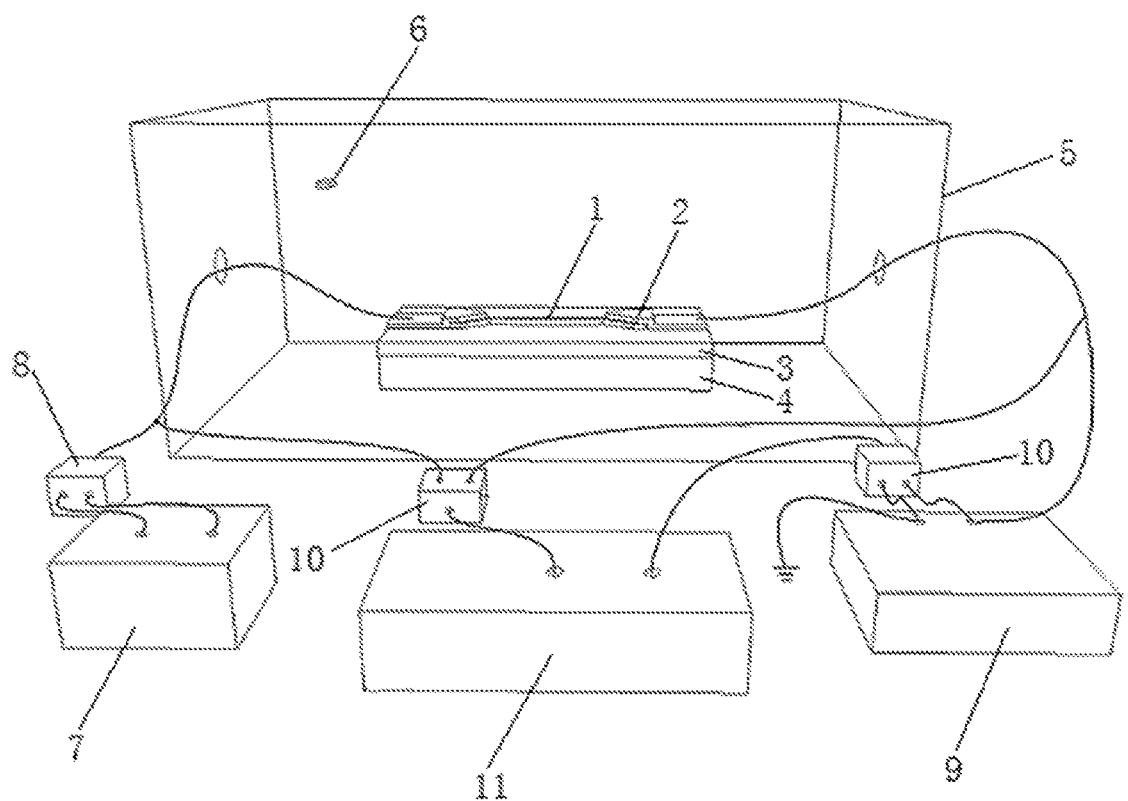
FIG. 1 is a schematic structural diagram of a testing device for the thermal conductivity of a nanoscale material provided by an embodiment of the present disclosure.

Description of symbols in the accompanying drawings: 1: to-be-tested nanoscale material; 2: electrode; 3: insulating medium layer; 4: substrate medium layer; 5: heating furnace; 6: thermocouple; 7: signal generator; 8: power amplifier; 9: adjustable resistance box; 10: single-gain differential amplifier; and 11: lock-in amplifier.

DESCRIPTION OF THE EMBODIMENTS

Technical solutions in embodiments of the present disclosure will be clearly and completely described below with reference to the accompanying drawings in the embodiments of the present disclosure. Obviously, the described embodiments are only a part of embodiments instead of all embodiments of the present disclosure. All other embodiments obtained by those of ordinary skill in the art without creative work based on the embodiments of the present disclosure shall fall within the protective scope of the present disclosure.

A principle adopted in the present disclosure is as follows: corresponding voltage fluctuation is generated on a material by virtue of an alternating current with a specific frequency ω, the thermal conductivity of the material is solved in consideration of dissipation parts $Q_{sub}$ and $Q_{air}$ of thermal conduction of the material to a substrate with double layers of mediums below the material and a surrounding ambient gas respectively, and a corresponding theoretical derivation and calculation formula is as follows:

a nanoscale material is heated by being applied with an alternating current based on a one-dimensional thermal conduction equation in consideration of heat dissipation of the substrate and air:

$$\rho C_\rho \frac{\partial \theta_{(x,t)}}{\partial t} - \kappa \frac{\partial^2 \theta_{(x,t)}}{\partial x^2} = \frac{I_0^2 \sin\omega t}{LS}[R_0 + R'\theta_{(x,t)}] - Q_{sub} - Q_{air} \quad (1)$$

boundary conditions thereof are:

$$\begin{cases} \theta_{(0,t)} = 0 \\ \theta_{(L,t)} = 0 \\ \theta_{(x,-\infty)} = 0 \end{cases}$$

$$Q_{sub} = \frac{A_1 \theta_{(x,t)}}{LS\left(\frac{d_1}{\kappa_2} - \frac{\sqrt{\kappa_2, c_2 \pi f}}{\kappa_2}\right)}$$

obtains a value of heat dissipation by virtue of an insulating layer and the substrate; and $$Q_{air} = \frac{A_2 \theta_{(x,t)}}{LS \frac{\sqrt{\kappa_3 / C_3 \pi f}}{\kappa_3}}$$

obtains a value of heat dissipation by virtue of air.

The above one-dimensional thermal conduction equation is solved to obtain temperature fluctuation $\theta_{(x,t)}$ on the nanoscale material, and corresponding resistance fluctuation on the nanoscale material is obtained according to $$dR = \frac{R'}{L} \int_0^L \theta_{(x,t)} dx.$$

Voltages at two ends of the nanoscale material under the excitation of a current $I_0 \sin \omega t$ are obtained according to $V_{(t)} = I_0 \sin \omega t (R_0 + dR)$, wherein a triple-frequency voltage signal component is obtained according to:

$$V_{3\omega} = \frac{2I_0^3 R_0 R' L}{\pi^4 \kappa S + \frac{\pi^2 L A_1}{\left(\frac{d_1}{\kappa_1} + \frac{\sqrt{\kappa_2/c_2 \pi f}}{\kappa_2}\right)} + \frac{\pi^2 L A_2}{\frac{\sqrt{\kappa_3/c_3 \pi f}}{\kappa_3}}} \quad (2)$$

and therefore, an expression of the thermal conductivity of the nanoscale material is:

$$\kappa = \left[\frac{2I_0^3 R_0 R' L}{V_{3\omega}} - \frac{\pi^2 L A_1}{\left(\frac{d_1}{\kappa_1} + \frac{\sqrt{\kappa_2/c_2 \pi f}}{\kappa_2}\right)} - \frac{\pi^2 L A_2}{\frac{\sqrt{\kappa_3/c_3 \pi f}}{\kappa_3}}\right] / \pi^4 S, \quad (3)$$

wherein $A_1$ is a contact area of the nanoscale material and the substrate, $A_2$ is an area of the nanoscale material exposed in an ambient gas, and S is a sectional area of the nanoscale material.

Embodiment 1

An embodiment of the present disclosure provides a testing method for a thermal conductivity of a nanoscale material, including the following steps.

In step 1, a to-be-tested nanoscale material is prepared or placed on a substrate, and electrodes are plated at two ends of the to-be-tested nanoscale material, wherein the substrate includes a substrate medium layer and an insulating medium layer located on the substrate medium layer, and the insulating medium layer has a thickness $d_1$ and a thermal conductivity $\kappa_1$, and the substrate medium layer has a thermal conductivity $\kappa_2$ and a thermal capacity $c_2$; and a part, located between the two electrodes, of the to-be-tested nanoscale material is used as a part for a thermal conductivity test, and the part for the thermal conductivity test has a length L, a line width w and a thickness d.

The to-be-tested nanoscale material may be directly prepared on the substrate, or an existing to-be-tested nanoscale material is placed on the substrate in the step, the to-be-tested nanoscale material is in contact with the insulating medium layer on the substrate and is exposed in a gas atmosphere, the electrodes are in contact with two ends of the part, for the thermal conductivity test, of the nanoscale material to apply an excitation current and also test a voltage signal, and the electrodes are optionally shaped and are made of any materials such as gold (Au), silver (Ag), platinum (Pt), tungsten alloy (TiW), and so on.

In step 2, the to-be-tested nanoscale material and the substrate are placed in a gas atmosphere with a variable ambient temperature T, and resistance values $R_0$, $R_1$, $R_2$ . . . of the to-be-tested nanoscale material at different ambient temperatures $T_0$, $T_0$, $T_2$ . . . are measured by changing the ambient temperature of the gas atmosphere, and linear fitting is performed between a temperature and a resistance so as to determine a resistance temperature coefficient R' of the to-be-tested nanoscale material and a resistance value $R_0$ at an ambient temperature $T_0$.

In step 3, a filling gas in the gas atmosphere is kept to have a thermal conductivity $\kappa_3$ and a thermal capacity $c_3$ at the ambient temperature $T_0$ of the gas atmosphere, and an excitation current $I_0 \sin \omega t$ with a frequency $\omega = 2\pi f$ is applied to two ends of the to-be-tested nanoscale material, temperature fluctuation with a frequency $2\omega$ may be generated on the to-be-tested nanoscale material due to a thermal effect of the current, resistance fluctuation with a frequency $2\omega$ may be generated on the to-be-tested nanoscale material due to a certain resistance temperature coefficient existing on the to-be-tested nanoscale material, and the resistance fluctuation with the frequency $2\omega$ and the current with the frequency $2\omega$ are coupled to generate a small signal voltage $V_{3\omega}$ with a frequency $3\omega$.

In step 4, the small signal voltage $V_{3\omega}$ is measured, and calculation is performed according to the following formula in combination with the above test data to obtain the thermal conductivity $\kappa$ of the to-be-tested nanoscale material at the ambient temperature $T_0$:

$$\kappa = \left[\frac{2I_0^3 R_0 R' L}{V_{3\omega}} - \frac{\pi^2 L A_1}{\left(\frac{d_1}{\kappa_1} + \frac{\sqrt{\kappa_2/c_2 \pi f}}{\kappa_2}\right)} - \frac{\pi^2 L A_2}{\left(\frac{\sqrt{\kappa_3/c_3 \pi f}}{\kappa_3}\right)}\right] / \pi^4 S,$$

wherein $A_1$ is a contact area of the to-be-tested nanoscale material and the substrate, $A_2$ is an area of the to-be-tested nanoscale material exposed in an ambient gas, and S is a sectional area of the to-be-tested nanoscale material.

By using the testing method disclosed in the disclosure, the thermal conductivity of each material at nanoscale may be accurately measured, the method is improved with the specific disadvantages that an existing $3\omega$ method requires a to-be-tested section of the nanoscale material to be suspended and requires a high-vacuum test environment and the reference value of the tested thermal conductivity value is finite due to the incompatibility of a preparation process of the nanoscale material and a semiconductor process, amending is made based on a test principle, analysis for thermal conduction processes from the to-be-tested nanoscale material to a multilayer film substrate in contact with the to-be-tested nanoscale material and from the to-be-tested nanoscale material to a surrounding air environment is additionally provided, and errors caused in a test process are eliminated, so that the to-be-tested nanoscale material in the method may directly grow or be placed on the multilayer film substrate, and restrictive conditions of the suspension of the to-be-tested section and the high-vacuum test environment are eliminated. Therefore, the test structure and the test environment of the to-be-tested nanoscale material are simpler, the preparation way is more diversified, and particularly, the testing method is compatible with an existing semiconductor process, so that the thermal conductivity of the prepared to-be-tested nanoscale material has higher reference significance.

As a preference of the above embodiments, the part, for the thermal conductivity test, of the to-be-tested nanoscale material is of a one-dimensional linear structure such as a nanowire, a nanotube, a nanobelt and so on, and parts plated with the electrodes are optionally shaped.

In the above embodiments, the substrate may also be only provided with the substrate medium layer, but not include the insulating medium layer, the to-be-tested nanoscale material is in direct contact with the substrate medium layer, and the formula of the corresponding thermal conductivity κ may also be accordingly changed. As a special implementation way of the above embodiment, if the part, for the thermal conductivity test, of the to-be-tested nanoscale material is in direct contact with the substrate medium layer, namely the thickness of the insulating medium layer is zero, a term $$\frac{\pi^2 L A_1}{\left(\frac{d_1}{\kappa_1} + \frac{\sqrt{\kappa_2/c_2 \pi f}}{\kappa_2}\right)}$$

in the formula of the thermal conductivity κ is simplified to be $$\frac{\pi^2 L A_1}{\frac{\sqrt{\kappa_2/c_2 \pi f}}{\kappa_2}}.$$

In the above embodiments, in a corresponding test performed when the ambient temperature of the gas atmosphere is $T_0$, the gas atmosphere may be not filled with any gas and directly vacuum, and thus, the formula of the corresponding thermal conductivity κ may also be accordingly changed. As a special implementation way of the above embodiment, if the filling gas in the gas atmosphere is vacuum when the ambient temperature of the gas atmosphere is $T_0$, the value of the term $$\frac{\pi^2 L A_2}{\frac{\sqrt{\kappa_3/c_3 \pi f}}{\kappa_3}}$$

in the formula of the thermal conductivity κ is zero.

Preferably, in order to ensure the accuracy of a test result, both the line width w and the thickness d of the part, for the thermal conductivity test, of the to-be-tested nanoscale material range from 1 nm to 1000 nm.

Preferably, the line width w and the line length L of the part, for the thermal conductivity test, of the to-be-tested nanoscale material meet a relationship: L≥10*w, so that it is ensured that the part, for the thermal conductivity test, of the to-be-tested nanoscale material may be regarded to be of the one-dimensional linear structure when a nanowire is analyzed.

Preferably, the to-be-tested nanoscale material is a semiconductor material such as Si, GeTe, $Ge_2Sb_2Te_5$, $Sb_2Te_3$ and so on.

Preferably, the thickness of the insulating medium layer is smaller than a penetration depth $\lambda_1$ of a thermal wave in the insulating medium layer, wherein $\lambda_1 = \sqrt{\kappa_1/c_1 \pi f}$, and the thickness of the substrate medium layer is greater than a penetration depth $\lambda_2$ of a thermal wave in the substrate medium layer, wherein $\lambda_2 = \sqrt{\kappa_2/c_2 \pi f}$.

Embodiment 2

Figure 2:
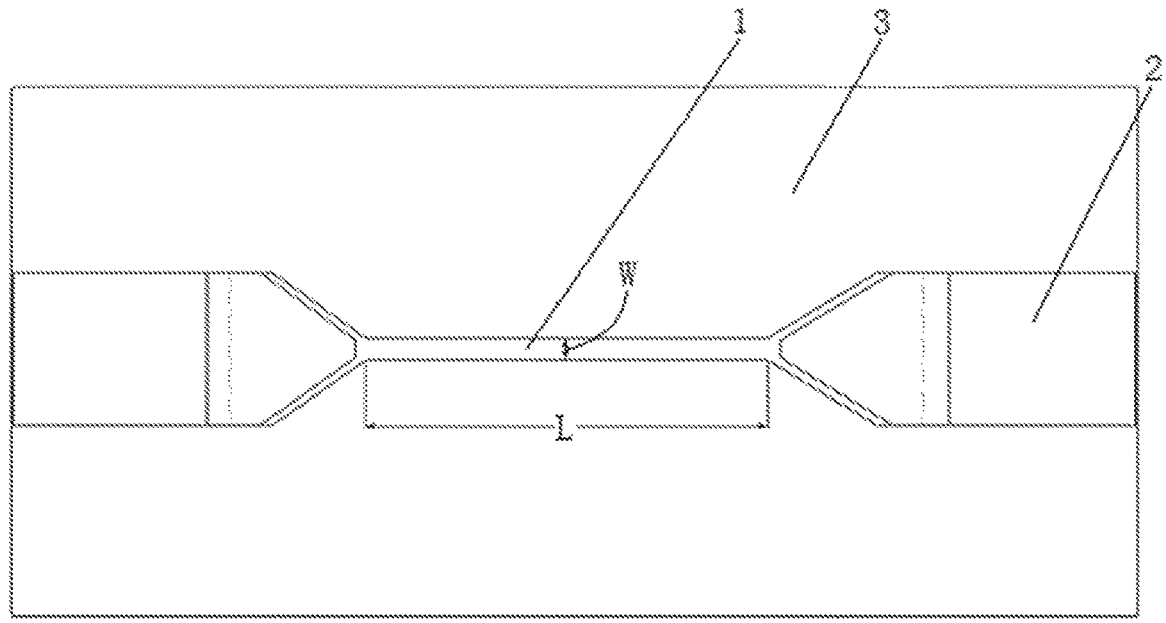
FIG. 2 is a vertical view of a combined structure of a to-be-tested nanoscale material and a substrate in the device as shown in FIG. 1.
Figure 3:
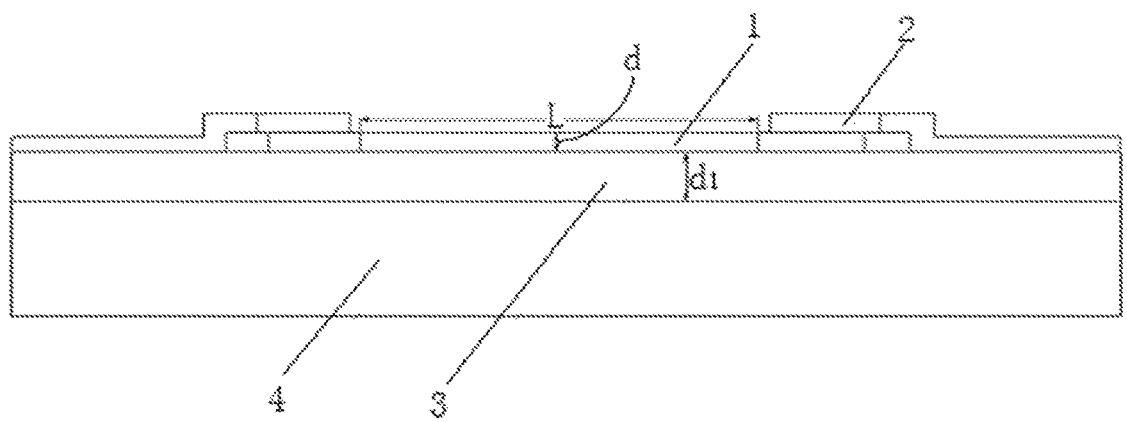
FIG. 3 is a front view of the combined structure of the to-be-tested nanoscale material and the substrate in the device as shown in FIG. 1.

As shown in FIG. 1 to FIG. 3, an embodiment of the present disclosure further provides a testing device for a thermal conductivity of a nanoscale material, which can realize the above testing method for the thermal conductivity of a nanoscale material. The testing device includes a heating furnace 5, a signal generator 7, a power amplifier 8, an adjustable resistance box 9, single-gain differential amplifiers 10 and a lock-in amplifier 11, wherein a substrate is arranged inside the heating furnace 5 and configured to place a to-be-tested nanoscale material 1 with two ends plated with electrodes 2, and the heating furnace 5 is internally provided with a temperature thermocouple 6; the signal generator 7 is electrically connected with the power amplifier 8, the power amplifier 8 is configured to be electrically connected with the electrode 2 at one end of the to-be-tested nanoscale material 1, the adjustable resistance box 9 is configured to be electrically connected with the electrode 2 at the other end of the to-be-tested nanoscale material 1, the signal generator 7 is configured to generate a sine alternating signal with a known frequency and amplitude value and transmit the sine alternating signal to the power amplifier, and the power amplifier is configured to convert an electric signal input by the signal generator into a current signal and amplify the current signal so as to drive the heating of the to-be-tested nanoscale material 1 and drive the adjustable resistance box 9, and the adjustable resistance box 9 is configured to provide a voltage signal only containing a fundamental wave voltage under current excitation; the two single-gain differential amplifiers 10 are provided, one of the single-gain differential amplifiers 10 is configured to be electrically connected with the electrodes 2 at the two ends of the to-be-tested nanoscale material 1, and the other single-gain differential amplifier 10 is electrically connected with the adjustable resistance box 9, and the two single-gain differential amplifiers 10 are respectively configured to extract a voltage signal at the two ends of the to-be-tested nanoscale material 1 from the electrodes, extract a voltage signal from the adjustable resistance box 9 and input the two voltage signals to the lock-in amplifier 11; and the lock-in amplifier 11 is configured to separate a fundamental wave voltage and a triple-frequency voltage from the voltage signal on the to-be-tested nanoscale material and the voltage signal on the adjustable resistance box.

Preferably, the substrate includes a substrate medium layer 4 and an insulating medium layer 3 located on the substrate medium layer 4 so as to avoid current leakage when an excitation current is applied.

During use, the temperature inside the heating furnace is raised to $T_0$, and the temperature $T_0$ in the furnace is recorded by the thermocouple 6 after being stabilized. The signal generator 7 outputs an electric signal with a current $I_0$ sin ωt, and the electric signal is converted into the current signal by the power amplifier 8 to drive the heating of the to-be-tested nanoscale material 1 and drive the adjustable resistance box 9, the voltage signals on the to-be-tested nanoscale material 1 and the adjustable resistance box 9 are respectively input to the lock-in amplifier 11 by the corresponding single-gain differential amplifiers 10, and the voltage signal with a fundamental frequency ω is selected and differentiated. The resistance value of the adjustable resistance box 9 is adjusted until an indication of the lock-in amplifier 11 is zero, at the moment, the resistance value $R_0$ of the adjustable resistance box 9 is the resistance value of the to-be-tested nanoscale material 1 at the temperature $T_0$, the temperature inside the heating furnace 5 is adjusted, the above operations are repeated, and thus, the resistance values of the to-be-tested nanoscale material at different temperatures are measured. The temperature inside the heating furnace 5 is adjusted to $T_0$, the resistance value of the adjustable resistance box 9 is adjusted to $R_0$, the signal generator 7 outputs the electric signal with the current $I_0 \sin \omega t$, and the electric signal is converted into the current signal by the power amplifier 8 to drive the heating of the to-be-tested nanoscale material 1 and drive the adjustable resistance box 9, the voltage signals on the to-be-tested nanoscale material 1 and the adjustable resistance box 9 are respectively input to the lock-in amplifier 11 by the corresponding single-gain differential amplifiers 10, a triple-frequency voltage signal with a frequency $3\omega$ is selected and differentiated, and thus, a voltage indication of the lock-in amplifier 11 is the triple-frequency voltage $V_{3\omega}$ on the to-be-tested nanoscale material 1. The triple-frequency voltages on the to-be-tested nanoscale material 1 under the drive of different current amplitude values are measured by adjusting the amplitude value of the electric signal output by the signal generator 7. The above test result is substituted into the formula (3) of the thermal conductivity, and thus, the thermal conductivity value of the to-be-tested nanoscale material 1 at the temperature $T_0$ may be obtained.

A process of measuring the thermal conductivity of a material at a nanoscale by using the testing method and system is demonstrated below by taking a phase-change material $Ge_2Sb_2Te_5$ (GST) as an example.

Figure 4:
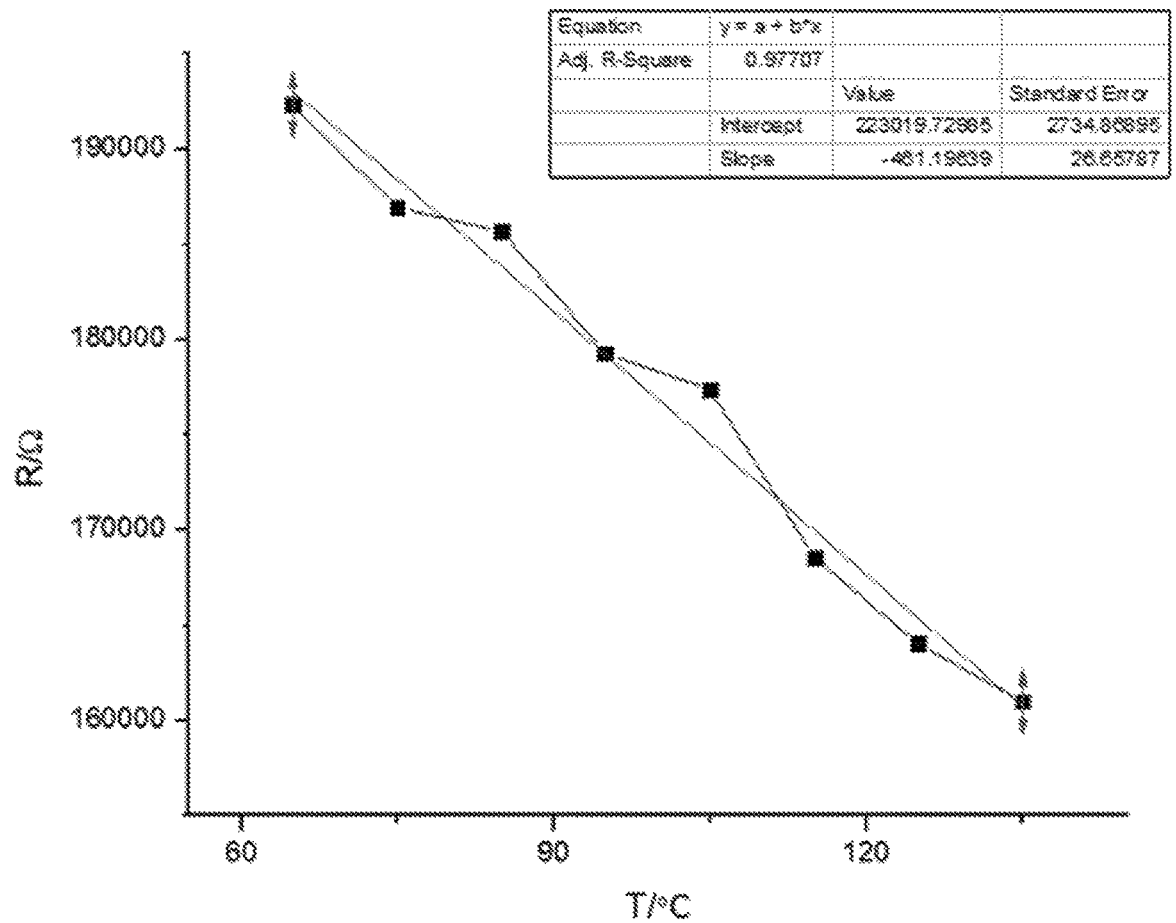
FIG. 4 is a schematic diagram of a resistance-temperature test result of a material tested by the testing device provided by an embodiment of the present disclosure.

A monocrystal silicon substrate on which a silicon dioxide insulating layer grows is adopted, wherein the thickness of a silicon dioxide layer is 1000 nm, and the thermal conductivity of silicon dioxide is 1.34 W/mK; and the monocrystal silicon substrate has the thickness of 500 um, the thermal conductivity of 149 W/mK and the thermal capacity of 2.1364 J/K*cm³. A nano pattern is exposed and developed through an electron beam by virtue of a lift-off process, a GST material is deposited by virtue of laser pulse and is stripped to obtain a GST nanostructure, and the part, for the thermal conductivity test, of the to-be-tested nanoscale material has the line length L=2 um, the line width w=100 nm and the thickness d=80 nm. Two ends of the GST material are covered with electrodes by using the lift-off process again, and the electrodes are made of platinum. The GST material obtained by laser pulse deposition is amorphous, extremely high in resistance value and inconvenient to test so as to be required to be subjected to annealing operation to reach a metastable tetragonal state with a lower resistance value. The annealing operation is completed by placing the above nanoscale GST material test structure in the heating furnace, performing heating to reach a temperature of 190° C., maintaining the temperature for 30 min and then performing slow cooling to reach a room temperature. Due to the heating of the heating furnace, the resistance values of the nanoscale GST material at different temperatures are tested to obtain temperature and resistance data referring to FIG. 4, and calculation is performed according to the temperature inside the furnace and the resistance value of the nanoscale GST material at the corresponding temperature to obtain the temperature resistance coefficient which is −461.2 Ω/K.

Figure 5:
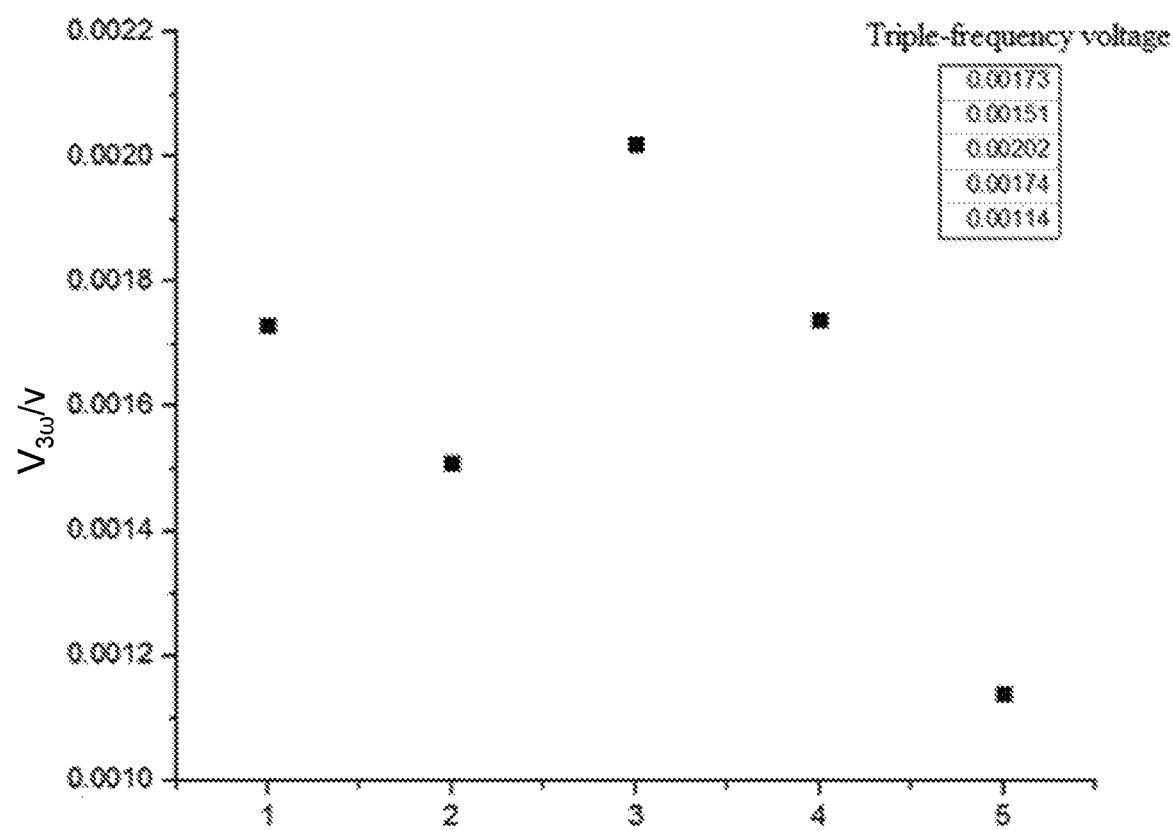
FIG. 5 is a schematic diagram of a triple-frequency voltage test result of a material tested by the testing device provided by an embodiment of the present disclosure.

When the temperature in the furnace is reduced to the room temperature and is kept stable, the inside of the furnace is filled with air serving as the gas atmosphere, the air has the thermal conductivity of 0.02552 W/mK and the thermal capacity of 0.0001479 J/K*cm³ at the room temperature, and through tests, the resistance of a GST nanowire is 215 KΩ. A sine alternating current signal with a frequency of 200 HZ and an amplitude value of 2 uA, generated by the signal generator, is applied to a to-be-tested nanoscale GST material, the lock-in amplifier is adjusted to a differential mode, a fundamental frequency signal "Harm #" is selected as 1, and the resistance value of the adjustable resistance box is adjusted until a difference of signals at two ends of the lock-in amplifier is zero. The lock-in amplifier is adjusted to the differential mode, a triple-frequency signal "Harm #" is selected as 3, the triple-frequency voltage signal $V_{3\omega}$ on the nanoscale GST material at the frequency and the excitation current is measured, related data refer to FIG. 5, and a mean value of the related data is 0.001626V. The thermal penetration depths of a thermal wave in silicon dioxide and monocrystal silicon at the frequency are respectively 33.18 umh and 333.33 um calculated according to a formula $\lambda = \sqrt{\kappa/c\pi f}$, which proves that the thermal wave completely penetrates through the silicon dioxide layer, but does not penetrate through the monocrystal silicon layer, and therefore, the result conforms to the situation described by the formula of the thermal conductivity in the present disclosure, the above data are substituted into the expression (3) of the thermal conductivity of the nanoscale material to be calculated to obtain that the thermal conductivity value of the nanoscale GST material with the above size at the room temperature is 0.84477 W/mK. Compared with a formula for the thermal conductivity $$\kappa = \frac{\sqrt{2} I_0^3 R_0 R' L}{V_{3\omega} \pi^4 S}$$

which is originally suitable for a suspended nanoscale material and by which the thermal conductivity value is calculated to be 1.77073 W/mK, the formula in the present disclosure may be used to effectively correct effects caused by thermal transfer resulted from contact with the substrate and heat dissipation of the air atmosphere, so that a test result is more accurate.

The above description is only preferred embodiments of the present disclosure, rather than to limit the present disclosure, and any modifications, equivalent replacements, improvements and the like within the spirit and principle of the present disclosure should fall within the protective scope of the present disclosure.

What is claimed is:
1. A testing method for a thermal conductivity of a nanoscale material, comprising the following steps:
   preparing or placing a to-be-tested nanoscale material on a substrate, and plating electrodes at two ends of the to-be-tested nanoscale material, wherein the substrate comprises a substrate medium layer and an insulating medium layer located on the substrate medium layer, and the insulating medium layer has a thickness $d_1$ and a thermal conductivity $\kappa_1$, and the substrate medium layer has a thermal conductivity $\kappa_2$ and a thermal capacity $c_2$; and a part, located between the two electrodes, of the to-be-tested nanoscale material is used as a part for a thermal conductivity test, and the part for the thermal conductivity test has a length L, a line width w and a thickness d;

placing the to-be-tested nanoscale material and the substrate in a gas atmosphere with a variable ambient temperature T, and measuring resistance values of the to-be-tested nanoscale material at different ambient temperatures by changing the ambient temperature of the gas atmosphere so as to determine a resistance temperature coefficient R' of the to-be-tested nanoscale material and a resistance value $R_0$ at an ambient temperature $T_0$;

keeping a filling gas in the gas atmosphere have the thermal conductivity $\kappa_3$ and the thermal capacity $c_3$ at the ambient temperature $T_0$ of the gas atmosphere, and applying an excitation current $I_0 \sin \omega t$ with an angular frequency $\omega$ to the two ends of the to-be-tested nanoscale material to generate a small signal voltage $V_{3\omega}$, with an angular frequency $3\omega$ on the to-be-tested nanoscale material, wherein the filling gas includes air; and measuring the small signal voltage $V_{3\omega}$, and performing a calculation according to the following formula to obtain the thermal conductivity $\kappa$ of the to-be-tested nanoscale material at the ambient temperature $T_0$:

$$\kappa = \left[\frac{2 f_0^3 R_0 R' L}{V_{3\omega}} - \frac{\pi^2 L A_1}{\left(\frac{d_1}{\kappa 1} + \frac{\sqrt{\kappa_2/c_2 \pi f}}{\kappa_2}\right)} - \frac{\pi^2 L A_2}{\frac{\sqrt{\kappa_3/c_3 \pi f}}{\kappa_3}}\right]/\pi^4 S,$$

wherein $A_1$ is a contact area of the to-be-tested nanoscale material and the substrate, $A_2$ is an area of the to-be-tested nanoscale material exposed in the filling gas, f is a frequency of the excitation current, $\omega=2\pi f$, and S is a sectional area of the to-be-tested nanoscale material.

2. The testing method for the thermal conductivity of the nanoscale material according to claim 1, wherein the part, for the thermal conductivity test, of the to-be-tested nanoscale material is of a one-dimensional linear structure.

3. The testing method for the thermal conductivity of the nanoscale material according to claim 1, wherein if the part, for the thermal conductivity test, of the to-be-tested nanoscale material is in direct contact with the substrate medium layer, namely the thickness of the insulating medium layer is zero, the term $$\frac{\pi^2 L A_1}{\left(\frac{d_1}{\kappa 1} + \frac{\sqrt{\kappa_2/c_2 \pi f}}{\kappa_2}\right)}$$

in the formula of the thermal conductivity $\kappa$ is simplified to be $$\frac{\pi^2 L A_1}{\frac{\sqrt{\kappa_2/c_2 \pi f}}{\kappa_2}}.$$

4. The testing method for the thermal conductivity of the nanoscale material according to claim 1, wherein if the filling gas in the gas atmosphere is vacuum when the ambient temperature of the gas atmosphere is $T_0$, a value of the term $$\frac{\pi^2 L A_2}{\frac{\sqrt{\kappa_3/c_3 \pi f}}{\kappa_3}}$$

in the formula of the thermal conductivity $\kappa$ is zero.

5. The testing method for the thermal conductivity of the nanoscale material according to claim 1, wherein both the line width w and the thickness d of the part, for the thermal conductivity test, of the to-be-tested nanoscale material range from 1 nm to 1000 nm.

6. The testing method for the thermal conductivity of the nanoscale material according to claim 1, wherein the line width w and the length L of the part, for the thermal conductivity test, of the to-be-tested nanoscale material meet a relationship: $L \geq 10*w$.

7. The testing method for the thermal conductivity of the nanoscale material according to claim 1, wherein the to-be-tested nanoscale material is a semiconductor material.

8. The testing method for the thermal conductivity of the nanoscale material according to claim 1, wherein the thickness of the insulating medium layer is smaller than a penetration depth $\lambda_1$ a thermal wave in the insulating medium layer, wherein $\lambda_1 = \sqrt{\kappa_1/c_1 \pi f}$, and a thickness of the substrate medium layer is greater than a penetration depth $\lambda_2$ of a thermal wave in the substrate medium layer, wherein $\lambda_2 = \sqrt{\kappa_2/c_2 \pi f}$, where $c_1$ is a thermal capacity of the insulating medium layer.

9. A testing device for a thermal conductivity of a nanoscale material, comprising a heating furnace, a signal generator, a power amplifier, an adjustable resistance box, two single-gain differential amplifiers and a lock-in amplifier, wherein a substrate is arranged inside the heating furnace and configured to place a to-be-tested nanoscale material with two ends plated with electrodes, and the heating furnace is internally provided with a temperature thermocouple; the signal generator is electrically connected with the power amplifier, the power amplifier is configured to be electrically connected with the electrode at one end of the to-be-tested nanoscale material, the adjustable resistance box is configured to be electrically connected with the electrode at the other end of the to-be-tested nanoscale material, the signal generator is configured to generate a sine alternating signal with a known frequency and amplitude value and transmit the sine alternating signal to the power amplifier, and the power amplifier is configured to convert the sine alternating signal input by the signal generator into a current signal and amplify the current signal so as to drive the heating of the to-be-tested nanoscale material and drive the adjustable resistance box, and the adjustable resistance box is configured to provide a first voltage signal only containing a fundamental wave voltage under the amplified current signal; one of the single-gain differential amplifiers is configured to be electrically connected with the electrodes at the two ends of the to-be-tested nanoscale material, and the other single-gain differential amplifier is electrically connected with the adjustable resistance box, and the two single-gain differential amplifiers are respectively configured to extract a second voltage signal at the two ends of the to-be-tested nanoscale material from the electrodes, extract the first voltage signal from the adjustable resistance box and input the first voltage signal and the second voltage signal to the lock-in amplifier; and the lock-in amplifier is configured to separate a fundamental wave voltage and a triple-frequency voltage from the second voltage signal on the to-be-tested nanoscale material and the first voltage signal on the adjustable resistance box.

10. The testing device for the thermal conductivity of the nanoscale material according to claim 9, wherein the substrate comprises a substrate medium layer and an insulating medium layer located on the substrate medium layer.

* * * * *